July 25, 1961 W. F. STEPHEN 2,993,737
APPARATUS FOR PROPELLING ARTICLES
Filed Feb. 23, 1960 3 Sheets-Sheet 1

INVENTOR
W. F. STEPHEN
BY J. L. Landis
ATTORNEY

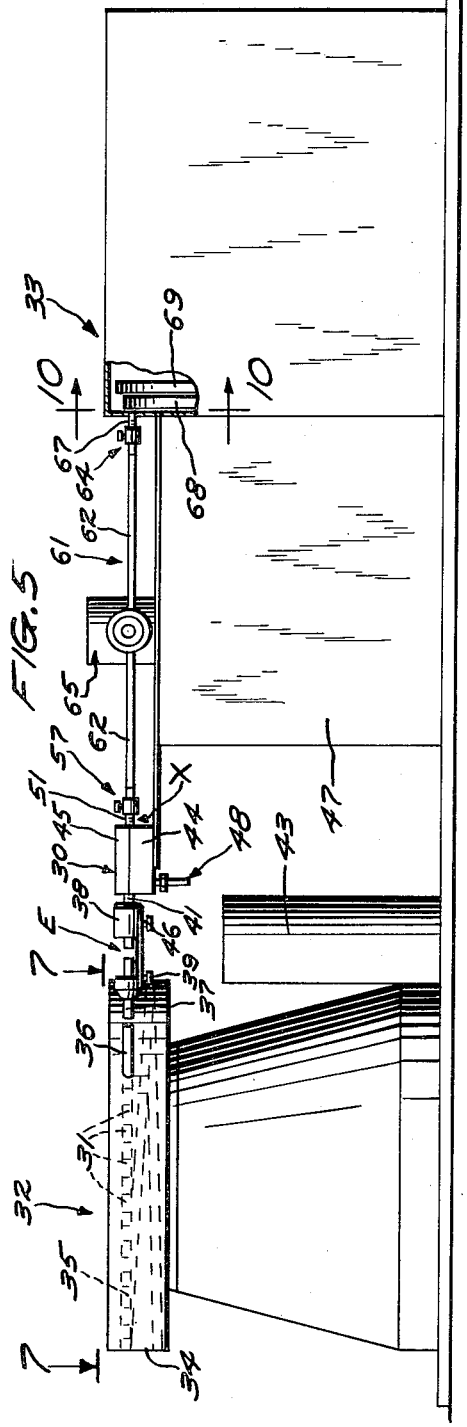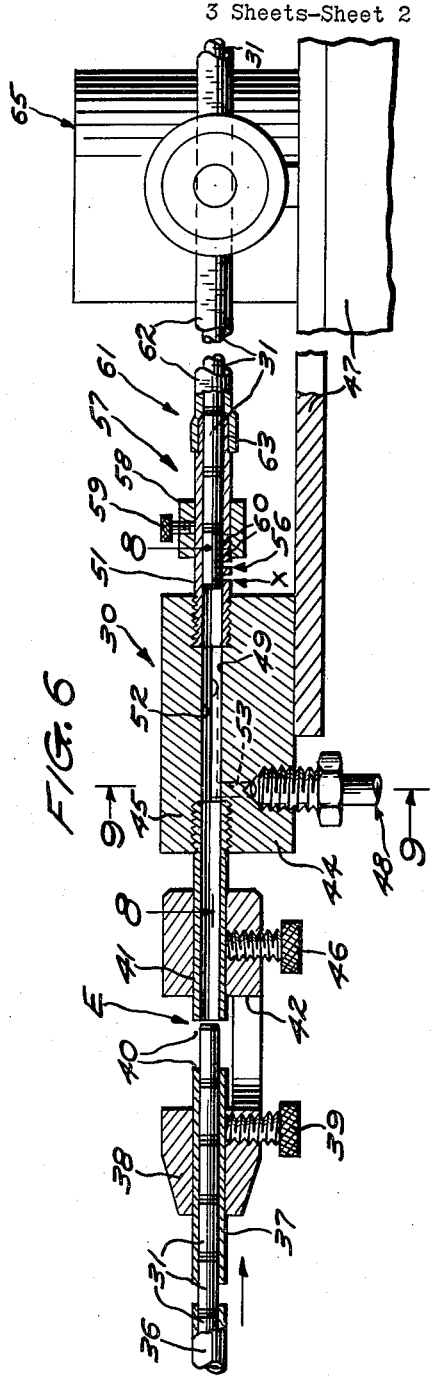

July 25, 1961 W. F. STEPHEN 2,993,737
APPARATUS FOR PROPELLING ARTICLES
Filed Feb. 23, 1960 3 Sheets-Sheet 3

INVENTOR
W. F. STEPHEN
BY J. L. Landis
ATTORNEY

United States Patent Office 2,993,737
Patented July 25, 1961

2,993,737
APPARATUS FOR PROPELLING ARTICLES
William F. Stephen, Elmwood Park, Ill., assignor to Western Electric Company, Incorporated, New York, N.Y., a corporation of New York
Filed Feb. 23, 1960, Ser. No. 10,215
6 Claims. (Cl. 302—2)

The present invention relates generally to apparatus for propelling articles, and more particularly to apparatus for quickly advancing a succession of articles from a feeding device to a utilizing device at a rate governed by the utilizing device.

Accordingly, a general object of the invention is to provide new and improved apparatus for propelling articles.

Another object of the invention is to provide new and improved apparatus for advancing a succession of articles from a feeding device to a utilizing device.

In various installations, it is required to transport articles from a feeding device, such as a vibratory feeder or gravity chute, to a utilizing device, such as a conveyor or transfer mechanism, at a rate which is dependent on the operation of the utilizing device. In this instance, the utilizing device may operate intermittently, at varying speeds, or at variable intervals between periods of operation; however, it is desired to transport an article quickly to the utilizing device each time the utilizing device is moved to a position for receiving articles.

Accordingly, still another object of the invention is to provide new and improved apparatus for quickly advancing a succession of articles from a feeding device to a utilizing device at a rate governed by the utilizing device.

In the manufacture of deposited carbon resistors in the telephone industry, small cylindrical resistors are provided having, for example, a length of ¾" and a diameter of ⅛". These resistors are relatively fragile, and must not be subjected to shocks or stresses of any great magnitude. These resistors are formed with a ceramic core, a thin layer of carbon applied to the core by the decomposition of hydrocarbon gasses, and a conducting layer of silver paint at the ends thereof. In the manufacture, testing and packaging of such resistors by mass-production techniques, it is necessary to transport these small resistors, or the partially processed resistors, quickly from one operation to the next, from feeding devices to utilizing devices, several times during the complete manufacturing operation.

A specific object of the invention is to provide new and improved apparatus for automatically transporting small and fragile cylindrical articles, such as deposited carbon resistors, from feeding devices to utilizing devices at a high rate with a minimum of breakage.

An apparatus for propelling an article, embodying certain features of the invention, may include a tube (hereinafter termed a Venturi tube) having a bore designed to pass the article therethrough, a source of compressed gas, and a conduit connecting with the source of compressed gas and emptying into the bore in the Venturi tube at an acute angle pointing toward an exit end thereof. A mechanism is provided for feeding the article to a point adjacent to and in alignment with an entrance end of the tube, so that the article is sucked into the entrance end of the tube and is blown out the exit end thereof.

When a succession of articles is to be advanced from a feeding device to a utilizing device at a rate determined by the utilizing device, a feed tube is provided leading to an entrance end of the Venturi tube unit with an entrance aperture therebetween, and a delivery tube is provided leading from an exit end of the Venturi tube unit to the utilizing device with an exit aperture therebetween. The feeding means continuously urges a train of articles through the feed tube to the Venturi tube unit.

With this arrangement, the articles are propelled through the delivery tube at a faster rate than they are carried away by the utilizing device until the articles are packed solid in the delivery tube to a point where one of the articles blocks the exit aperture, after which the articles are precluded from entering the Venturi tube unit. When an opening exists in the utilizing device for another article, the line of articles in the delivery tube is forced forward one unit to feed one article to the utilizing device, and one article is transferred from the feed tube to the delivery tube blocking the exit aperture. The entrance aperture is preferably of such length as to drop undersize or broken articles out of the system.

Other objects, advantages and features of the invention will appear from the following detailed description of specific examples and embodiments thereof, when taken in conjunction with the appended drawings, in which:

FIG. 5 is a front view, with portions broken away, of a complete apparatus for handling deposited carbon resistors including a Venturi feed unit according to the invention;

FIG. 6 is an enlarged central vertical section of portions of the apparatus illustrated in FIG. 5;

Figure 1:
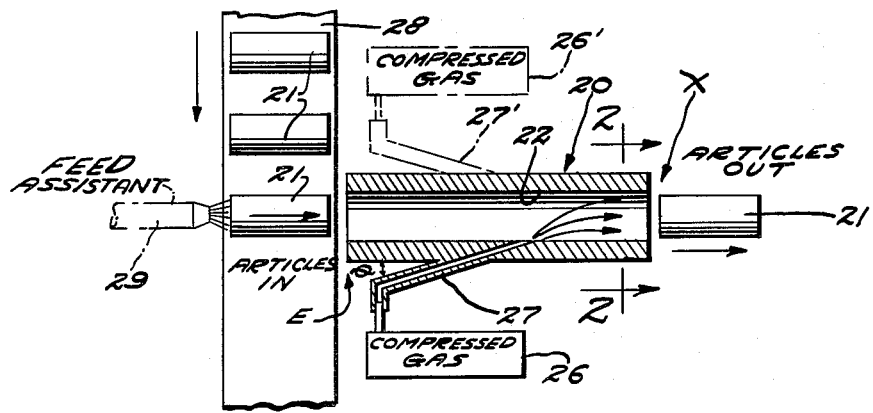
FIG. 1 is a schematic top view, partly in section, of a simplified Venturi tube for propelling articles in accordance with the invention.
Figure 2:
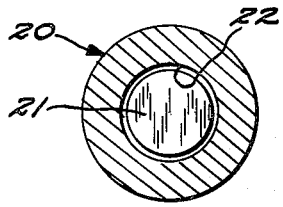
FIG. 2 is an enlarged vertical cross section, taken generally along the line 2—2 of FIG. 1 and showing the relative sizes of the tube and the object.

Referring now in detail to the drawings and particularly to FIGS. 1 and 2, there is shown a Venturi tube designated generally by the numeral 20 for propelling a succession of articles 21—21 from left to right as viewed in FIG. 1. The tube 20 is formed with a smooth bore 22 designed to pass the articles 21—21 therethrough, preferably with a clearance of between 0.005 and 0.015 inch between the walls of the bore 22 and the article 21 when the article is centered in the tube 20.

Figure 3:
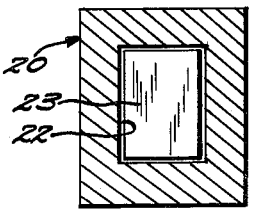
FIGS. 3 and 4 are views similar to FIG. 2, showing the tube configuration required for articles of diverse shapes.
Figure 4:
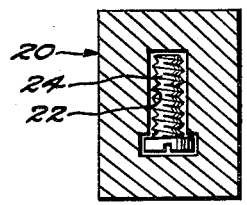

As illustrated in FIGS. 1 and 2, the articles are cylindrical and the bore of the tube is circular in cross section. However, if the article is a rectangular article 23, as illustrated in FIG. 3, then the bore 22 of the tube is of a corresponding, but larger, rectangular cross section. If the article has any other shape, such as a screw 24 shown in FIG. 4, then the bore 22 of the tube follows the contours of that shape.

Referring again to FIG. 1, a source of compressed gas 26 is provided, together with a conduit 27 connected with the source of compressed gas 26 and emptying into the bore 22 at an acute angle $\theta$ pointing toward an exit end X of the tube. The articles 21—21 are fed by hand or on a suitable mechanism such as a conveyor 28 to a point adjacent to and in alignment with an entrance end E of the tube 20, so that the articles are sucked into the entrance end of the tube and are blown out the exit end thereof by Venturi action. A vacuum exists at the left end of the tube 20, as viewed in FIG. 1, which tends to draw the articles 21—21 into the tube, while high pressure exists at the right end thereof which forces the articles out of the tube.

Preferably, a plurality of equal restricted streams of compressed gas are arranged symmetrically with respect to the tube and are forced into the bore at equal acute angles $\theta$, as indicated in FIG. 1 with respect to a second gas source 26' and a second conduit 27'. The provision of multiple conduits equalizes the flow in the tube 20 and centers the articles 21—21 in the tube. Best results are obtained when the angle $\theta$ is between about 10° and 20°, and this angle is preferably set at about 15°.

FIG. 1 illustrates particularly the situation where the articles 21—21 are to be advanced into space or to a utilizing device (not shown) at a rate governed by the operation of the feeding means. Regardless of whether the conveyor 28 operates continuously or intermittently, and regardless of the spacing of the articles 21—21 on the conveyor, the articles will be propelled by the Venturi tube 20 to the utilizing device whenever one of the articles is carried to a position where it is in alignment with the entrance end E of the Venturi tube 20. Any suitable device may be used to feed the articles to the tube 20, so long as the articles are free to advance into the entrance end E of the tube 20.

For many applications, such as where the article is relatively fragile or where it is otherwise not desired to propel the article at an excessive speed, it is preferred to insert a leading end of the article 21 slightly into the entrance end of the Venturi tube 20 to assist in the propelling operation. When this is done, the air pressure may be reduced as only a slight vacuum is needed at the entrance end of the Venturi tube 20. The article may be so inserted by hand, or with a feed assistant such as a relatively low pressure source 29 of compressed air that exerts a slight force tending to urge the articles 21—21 into the entrance end of the Venturi tube 20. Other feed assistants, such as camming members, may be provided to accomplish this step, or the feeding device may be so arranged as to feed the articles directly into the tube 20 as in the embodiment illustrated in FIG. 5.

Referring now to FIGS. 5 and 6, there is illustrated a complete apparatus including a composite Venturi feed unit 30 for advancing a succession of deposited carbon resistors 31—31 of the type previously described from a feeding device 32 to a utilizing device 33 at a rate that is dictated by the speed of operation of the utilizing device 33.

Figure 7:
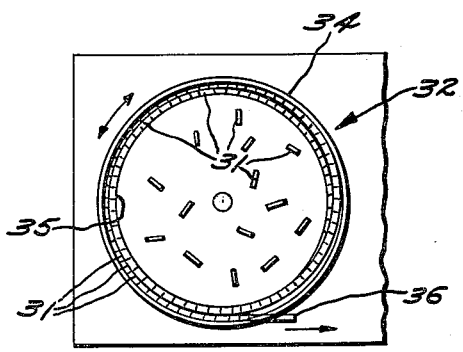
FIG. 7 is a reduced plan view of a vibratory feeder for the resistors, taken generally along the line 7—7 of FIG. 5.

In the specific embodiment shown in FIGS. 5 and 7, the feeding device 32 constitutes a "Syntron" vibratory feed unit of a type which is available commercially and is manufactured by the Syntron Corporation. The vibratory feed unit 32 is designed to orient a plurality of resistors 31—31, which were previously placed in a bowl 34 thereof in random fashion, into a continuous train and to feed the train in a counterclockwise direction, as viewed in FIG. 7, spirally outward and upward along a track 35 formed around the bowl 34. The resistors 31—31 pass from the track 35 through an outlet tube 36 of the unit 32 to a feed tube 37 for the Venturi unit 30. The output rate of the particular "Syntron" unit 32 utilized is approximately 250 resistors per minute, and that unit is adjusted so as to feed the resistors at a faster rate than they are to be carried away by the utilizing device 33 (about 200 resistors per minute in the specific machine illustrated).

The feed tube 37 is adjustably secured in a holder 38 by means of a set screw 39 so that an entrance aperture or gap 40 of a predetermined length is defined between the feed tube 37 and a short pipe 41 that constitutes a first portion of the Venturi feed unit 30 and defines the entrance end E thereof. The position of the feed tube 37 is adjusted so that the length of the gap 40 is slightly less than the expected length of the resistors 31—31. With this arrangement, any broken or undersize resistors will pass through a slot 42 provided in the bottom of the holder 38 to a collecting receptacle 43 shown in FIG. 5.

The right end (FIG. 6) of the pipe 41 is threaded into both a block member 44 and a cap member 45 constituting further portions of the Venturi feed unit 30, while the left end of the pipe 41 is secured in the holder 38 by means of a set screw 46. The sizing assembly consisting of the pipe 41, the holder 38 and the feed tube 37 is supported in cantilever fashion by the block 44 and cap 45.

The block 44 is mounted on a support 47 and is provided with a compressed air inlet 48. As viewed in FIGS. 6 and 8, the block 44 is formed with a semicircular groove 49 in the upper surface thereof, having counterbored tapped ends designed to receive the threaded pipe 41 at the left end thereof and a second threaded pipe 51 at the right end thereof. The cap 45 is bolted to the block 44 and is formed with a semicircular groove 52 matching the groove 49 and having counterbored tapped ends for receiving the threaded pipes 41 and 51.

When the various portions of the Venturi unit 30 are assembled as viewed in FIG. 6, the grooves 49 and 52 define a smooth circular bore having a diameter of approximately 0.140 inch. The bores in the pipes 41 and 51 are of the same diameter and are in exact alignment with the bore defined by the grooves 49 and 52, so that a composite bore is defined for passing the resistors 31—31 corresponding to the simple bore 22 illustrated in FIG. 1. Since the diameter of the resistors 31—31 is approximately 0.125 inch, a clearance of 0.0075 inch is provided on all sides, which is approximately the optimum clearance for handling resistors of this size.

Figure 8:
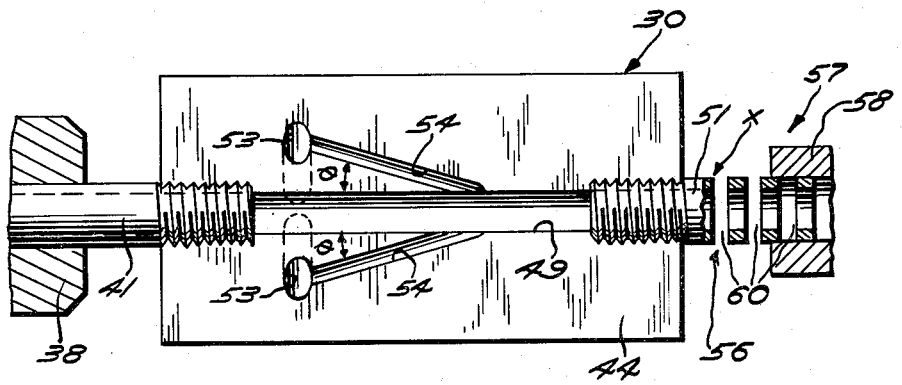
FIG. 8 is an enlarged horizontal section, taken generally along the line 8—8 of FIG. 6 and illustrating details of construction of the Venturi feed unit.
Figure 9:
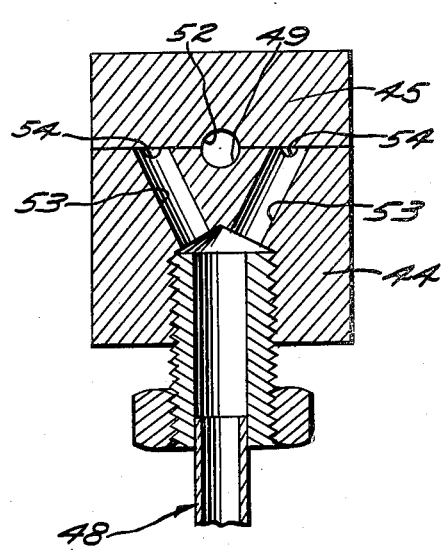
FIG. 9 is an enlarged vertical section, taken generally along the line 9—9 of FIG. 6 and illustrating further details of the Venturi feed unit.

As viewed in FIG. 9, the compressed air entering through the inlet 48 divides into two equal streams passing through a pair of symmetrical diverging channels 53—53 up through the block 44. As best seen in FIG. 8, each channel 53 communicates with one of a pair of restricted semicircular conduits 54—54 formed in the upper surface of the block 44. The conduits 54—54 incline forward and communicate with the groove 49 at opposite sides thereof at the acute angle $\theta$ of about 15°, as described previously, to propel the resistors 31—31 through the Venturi unit 30.

The pipe 51 is provided with an exit aperture or port 56 therealong, which constitutes the exit end X of the Venturi unit 30. The pipe 51 is a part of an adjustable valve unit 57 shown in FIGS. 6 and 8, which also includes a tubular shell 58 having the pipe 51 clamped therein in an adjustable position by means of a set screw 59. A plurality of transverse slots 60—60 are cut at intervals along the bottom of the pipe 51 (which define the exit port 56) so as to permit the escape of a variable amount of compressed air therethrough, depending on the degree to which the slots 60—60 are covered by the shell 58. This position is adjusted by loosening the set screw 59 and sliding the shell 58 on the pipe 51.

A delivery tube unit is provided, which is designated generally by the numeral 61 and which extends from the exit aperture or port 56 to the utilizing device 33. The delivery tube unit comprises the length of the pipe 51 that is covered by the shell 58 and a long plastic tube 62 that is fitted over a reduced end 63 of the pipe 51, as shown in FIG. 6, and extends from the valve unit 57 to a similar valve unit 64 located in advance of the utilizing device 33. Preferably, the tube 62 is continuous and is made of a transparent plastic. The tube 62 passes through a photoelectric detector unit 65 for sensing and indicating whether the plastic tube 62 is filled with a predetermined number of the resistors 31—31.

Figure 10:
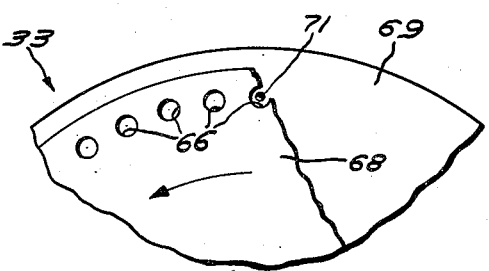
FIG. 10 is an enlarged fragmentary vertical section with portions broken away, taken generally along the line 10—10 of FIG. 5 and illustrating details of an article-utilizing device.

The utilizing device 33 is illustrated in FIGS. 5 and 10, and is of a type having a plurality of resistor-receiving seats 66—66 that are intermittently advanced into alignment with the delivery tube unit 61 to receive the resistors 31—31. In the specific embodiment shown, the seats 66—66 align with the discharge end of a short pipe 67 of the valve unit 64, which corresponds to the pipe 51 and to which the plastic tube 62 is connected. As viewed in FIG. 10, the seats 66—66 comprise circular bores provided at intervals near the outer periphery of an intermittently rotating transfer plate 68. The plate 68 rotates adjacent to a stationary backing plate 69 that is provided with a small hole 71 in direct alignment with the delivery tube 61 so as to provide free passage of the air out of the system when one of the seats 66—66 is also in alignment therewith. The transfer plate 68 carries the resistors 31—31 to any desired working, testing or loading devices (not shown). The photoelectric detector unit 65 is arranged so as to permit rotation of the plate 68 only when the resistors 31—31 fill the plastic tube 62 in the vicinity of the unit 65.

*Operation*

Assuming that the system is empty and it is desired to initiate operation, a multiplicity of the resistors 31—31 are dumped into the bowl 34 of the vibratory feed unit 32 either manually or by suitable automatic mechanism (not shown). The compressed air is turned on, but the plate 68 does not rotate because the photoelectric unit 65 does not sense any resistors present at that point. The unit 32 orients the resistors and advances them in a single file train upward and outward around the track 35. The resistors 31—31 then advance through the outlet tube 36 and through the feed tube 37 to the entrance end E of the Venturi feed unit 30. When this occurs, the resistors 31—31 are sucked into the entrance end of the Venturi feed unit 30 and are blown out the exit end X thereof and through the delivery tube unit 61 to a position abutting the plate 68.

A succession of the resistors 31—31 are similarly propelled down the plastic tube 62 and pack solidly therein until they reach the point where they block the light beam in the photoelectric sensing unit 65. When this occurs, the plate 68 begins rotating and carrying away the resistors 31—31 each time one of the seats 66—66 aligns with the delivery tube unit 61. However, the vibratory feed unit 32 and the Venturi feed unit 30 combine to propel the resistors into the delivery tube unit 61 faster than they are carried away by the utilizing device 33, so that the resistors 31—31 eventually pack solid in the delivery tube unit 61 to a point illustrated in FIG. 6 where one of the resistors 31—31 covers or blocks the exit aperture or port 56.

When this blocking occurs, a portion of the air current is shifted backward, to the left as viewed in FIG. 6, toward the feed tube 37 and blows out the entrance gap 40 so as to preclude any more of the resistors 31—31 from being advanced into the Venturi unit 30 by the vibratory feeder 32. The lead resistor 31 in the feed tube 37 occupies substantially the position indicated in FIG. 6, hanging cantilever fashion across the gap 40. As soon as another one of the resistors 31—31 is carried away by the transfer plate 68, the air current again shifts and the entire line of resistors in the delivery tube unit 61 is forced forward one unit to feed one resistor to the transfer plate 68, while one resistor is immediately transferred from the feed tube 37 to the delivery tube unit 61 to again close the exit port 56 and prevent further resistors from being advanced into the Venturi unit 30.

In this manner, the resistors 31—31 are urged alternately backward and forward in the vicinity of the entrance gap 40 by the alternate domination of the vibratory feed unit 32 and the compressed air when the exit port 60 is blocked, so as to cause to and fro movement of the resistors at that point. With this arrangement, the resistors 31—31 are accurately sized, and broken or undersize resistors pass out of the slot 42 in the bottom of the holder 38 to the receptacle 43. In addition, any dirt or foreign matter will be dropped out of the system through the slot 42.

The Venturi feed unit 30 will function in the described manner to advance the articles to the utilizing device 33 at a rate governed by the speed of operation of the utilizing device so long as entrance and exit apertures or ports of some type are provided (1) between the feed tube unit and the Venturi tube unit, and (2) between the Venturi tube unit and the delivery tube unit. These apertures may take the form of gaps between two distinct tube members, as shown with respect to the entrance aperture 40 in FIG. 6, or may be merely ports or holes in the wall of a single tube member, as shown with respect to the exit aperture 56.

While various specific examples and embodiments of the invention have been described in detail hereinabove, it will be obvious that various modifications may be made from the specific details described without departing from the spirit and scope of the invention.

What is claimed is:

1. Apparatus for advancing a succession of articles from a feeding device to a utilizing device of a type having a series of article-receiving seats that are intermittently advanced to a filling position, which comprises a Venturi tube unit having a bore designed to pass the articles therethrough, a source of compressed gas, a conduit connecting with said source of compressed gas and emptying into the bore in said tube at an acute angle pointing toward an exit end of said tube, a feed tube unit for conveying a continuous train of the articles from the feeding device to an entrance end of said Venturi tube unit for supplying a continuous train of the articles to the Venturi tube unit, an entrance aperture smaller in length than the articles being provided between the exit end of said feed tube unit and the entrance end of said Venturi tube unit, means for feeding a succession of the articles through said feed tube unit so that a slight force is exerted on the articles tending to urge them into the entrance end of said Venturi tube unit, said feeding means operating at a faster speed than the articles are carried away by the utilizing device, and a delivery tube unit for conveying the articles from the exit end of said Venturi tube unit to the utilizing device, an exit aperture smaller in length than the articles being provided between the exit end of said Venturi tube unit and the entrance end of said delivery tube unit whereby a vacuum normally exists adjacent to the entrance end of said Venturi tube unit that is effective to suck the articles one at a time from the feed tube unit into the entrance end of said Venturi tube, whereby high pressure exists on the exit-end side of said Venturi tube unit to blow the articles out the exit end of said Venturi tube and through said delivery tube unit into an aligned seat of the utilizing device, and whereby since the articles are continuously fed through said delivery tube unit to said utilizing device at a faster rate than they are carried away by the utilizing device the articles eventually pack solid in said delivery tube unit to a point where one of the articles blocks the exit aperture, after which the air current shifts backward toward said feed tube unit to preclude the articles being advanced to said Venturi tube unit by said feeding means from entering the entrance end of said Venturi tube until an empty seat of the utilizing device aligns with said delivery tube unit, after which the entire line of articles in said delivery tube unit is forced forward one unit to feed one article to the receiving device and one article is immediately transferred from said feed tube unit to said delivery tube unit to again close the exit aperture.

2. Apparatus for advancing a succession of cylindrical articles to a utilizing device of a type having a series of article-receiving seats that are intermittently advanced to a filling position, which comprises a Venturi tube unit having a circular bore slightly greater in diameter than the diameter of the articles; a source of compressed air;

a plurality of restricted conduits arranged symmetrically about said Venturi tube unit which connect with said source of compressed air and empty into the bore in said Venturi tube unit at equal acute angles pointing toward an exit end thereof; a feed tube unit arranged for passing a continuous train of the articles to an entrance end of said Venturi tube unit, an entrance aperture smaller in length than the articles being provided between the exit end of said feed tube unit and the entrance end of said Venturi tube unit, means for feeding a succession of the articles through said feed tube unit so that a slight force is exerted on the articles tending to urge them into the entrance end of said Venturi tube unit, said feeding means operating at a faster speed than the articles are carried away by the utilizing device; and a delivery tube unit for conveying the articles from the exit end of said Venturi tube unit to the utilizing device, an exit aperture smaller in length than the articles being provided between the exit end of said Venturi tube unit and the entrance end of said delivery tube unit; whereby a vacuum normally exists adjacent to the entrance end of said Venturi tube unit that is effective to suck the articles one at a time from the feed tube unit into the entrance end of said Venturi tube, whereby high pressure exists on the exit-end side of said Venturi tube unit to blow the articles out the exit end of said Venturi tube and through said delivery tube unit into an aligned seat of the utilizing device, and whereby since the articles are continuously fed through said delivery tube unit to said utilizing device at a faster rate than they are carried away by the utilizing device the articles eventually pack solid in said delivery tube unit to a point where one of the articles blocks the exit aperture, after which the air current shifts backward toward said feed tube unit to preclude the articles being advanced to said Venturi tube unit by said feeding means from entering the entrance end of said Venturi tube until an empty seat of the utilizing device aligns with said delivery tube unit, after which the entire line of articles in said delivery tube unit is forced forward one unit to feed one article to the utilizing device and one article is immediately transferred from said feed tube unit to said delivery tube unit to again close the exit aperture.

3. The advancing apparatus as recited in claim 2, wherein means are provided for sensing and indicating whether or not the delivery tube unit is filled with a predetermined number of the articles.

4. The advancing apparatus as recited in claim 2, wherein the entrance aperture along the feed tube has an open bottom and a length slightly smaller than a standard length expected for the articles, so that the alternate forward and backward urging caused adjacent to the exit end of the feed tube unit by the alternate domination of the feeding means and the compressed air when the exit aperture is blocked causes to and fro movement of the articles as they pass the entrance aperture and any articles which are broken or are otherwise undersize are not advanced to the utilizing device.

5. The apparatus as recited in claim 2, wherein the size of the apertures is adjustable, and wherein a further adjustable aperture is provided adjacent to the discharge end of the delivery tube unit.

6. The apparatus as recited in claim 2, wherein the clearance between the articles and the bore of the Venturi tube unit is between 0.005 and 0.015 inch.

References Cited in the file of this patent

UNITED STATES PATENTS

| | | |
|---|---|---|
| 1,943,451 | Needham | Jan. 16, 1934 |
| 2,801,884 | Friedman | Aug. 6, 1957 |
| 2,842,923 | Kjellsen | July 15, 1958 |
| 2,912,282 | Schult | Nov. 10, 1959 |